US006986522B2

(12) United States Patent
Sinclair et al.

(10) Patent No.: US 6,986,522 B2
(45) Date of Patent: Jan. 17, 2006

(54) PORTABLE FOLDING BICYCLE

(75) Inventors: Clive Marles Sinclair, London (GB); Alexander Joseph Kalogroulis, Coulsdon (GB)

(73) Assignee: Daka Research Inc., Tortolla (VG)

( * ) Notice: Subject to any disclaimer, the term of this patent is extended or adjusted under 35 U.S.C. 154(b) by 0 days.

(21) Appl. No.: 10/857,277

(22) Filed: May 28, 2004

(65) Prior Publication Data

US 2005/0263979 A1   Dec. 1, 2005

(51) Int. Cl.
 *B62K 15/00* (2006.01)
(52) U.S. Cl. ..................................... 280/287; 280/278
(58) Field of Classification Search ................ 280/278, 280/287
 See application file for complete search history.

(56) References Cited

U.S. PATENT DOCUMENTS 3,623,749 A * 11/1971 Jensen ......................... 280/278
4,460,191 A *  7/1984 Ishibashi et al. ............ 280/287
6,883,817 B2 *  4/2005 Chu ............................ 280/278
2004/0032110 A1 *  2/2004 Bigot .......................... 280/287
2004/0178604 A1 *  9/2004 Ma ............................. 280/278
2005/0035570 A1 *  2/2005 Chu ............................ 280/278

FOREIGN PATENT DOCUMENTS

EP        0388540 A1 *   3/1969
EP        0505598 A1 *   3/1991

* cited by examiner

*Primary Examiner*—Lesley D. Morris
*Assistant Examiner*—Marlon Arce-Diaz
(74) *Attorney, Agent, or Firm*—Curtis L. Harrington

(57) ABSTRACT

A folding bicycle presents a number of advantages over both conventional and other foldable bicycles. The folded size of 12 ×25×6 inches (305×635×153 millimeters) compares favorably to other folding bicycles, and its 11 lb. (eleven pound, or 5 kilogram mass) weight is significantly superior to even the closest lightweight model at eighteen pounds, and about half of the average portable bike weight of twenty-two pounds. The folded volume of the bike at 1800 square inches is slightly over one cubic foot. The portable bicycle has a folding stowage time of about 10 seconds, and a deployment time of about 6 seconds. A folding pedal and handle bar design contributes significantly to a folded lateral profile.

10 Claims, 8 Drawing Sheets

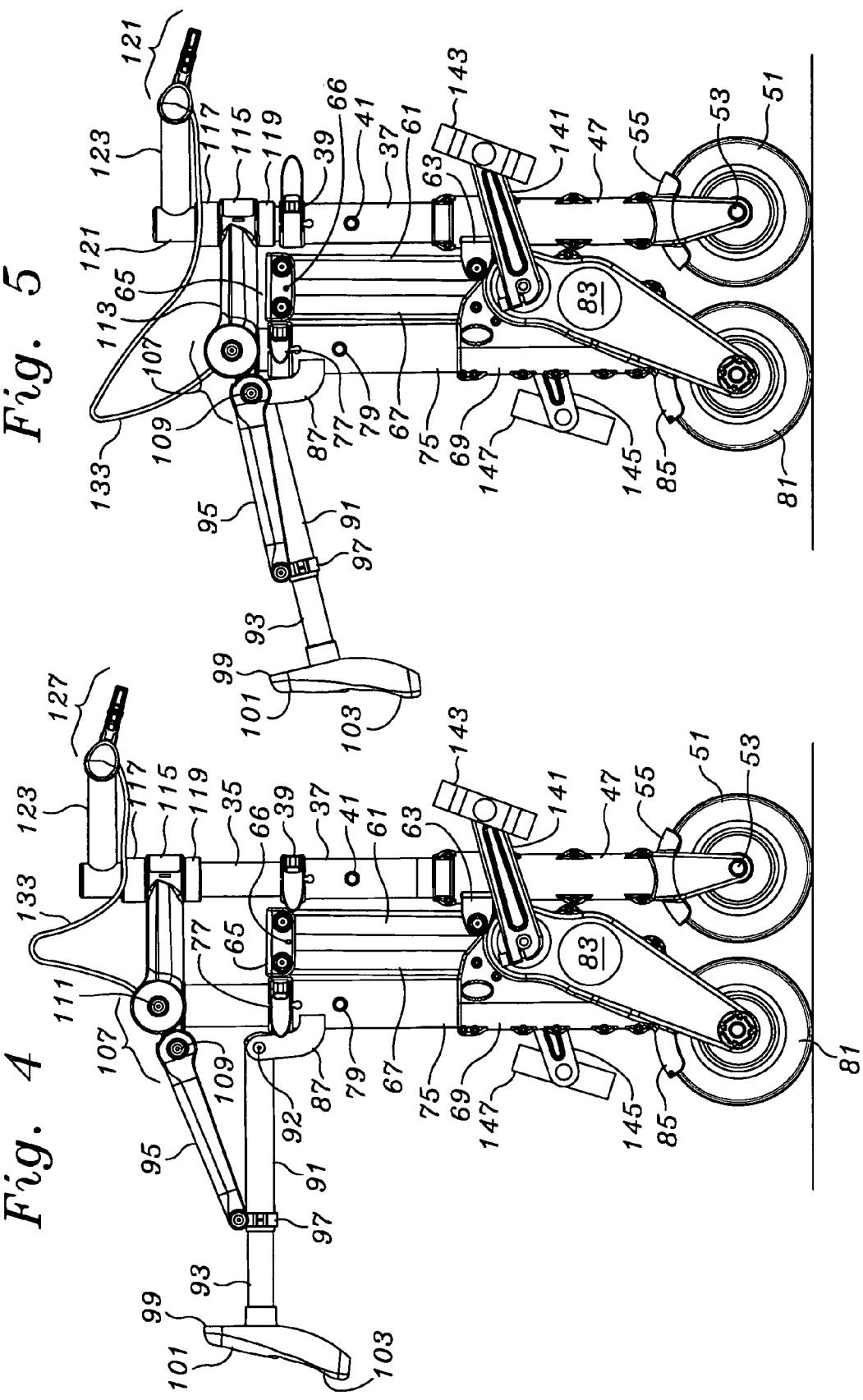

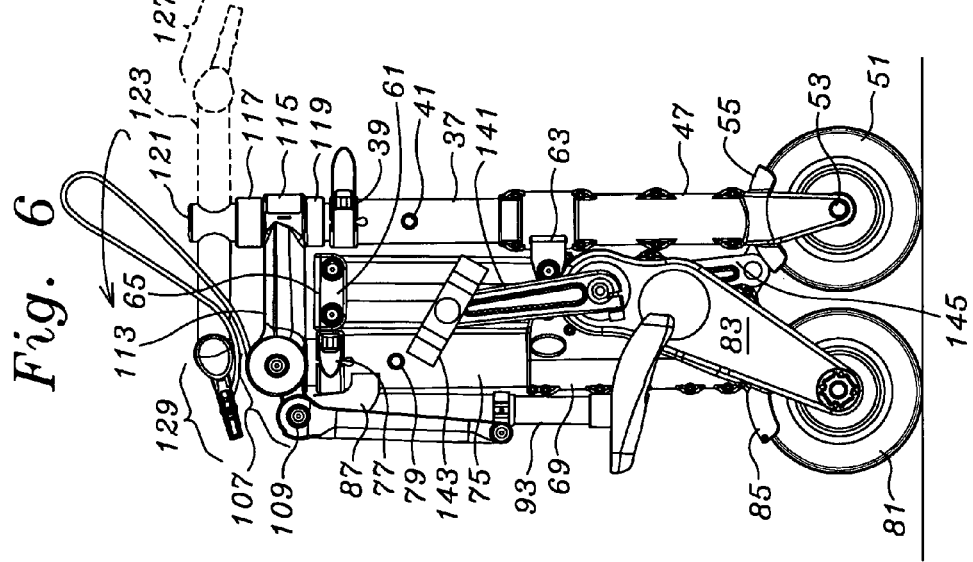

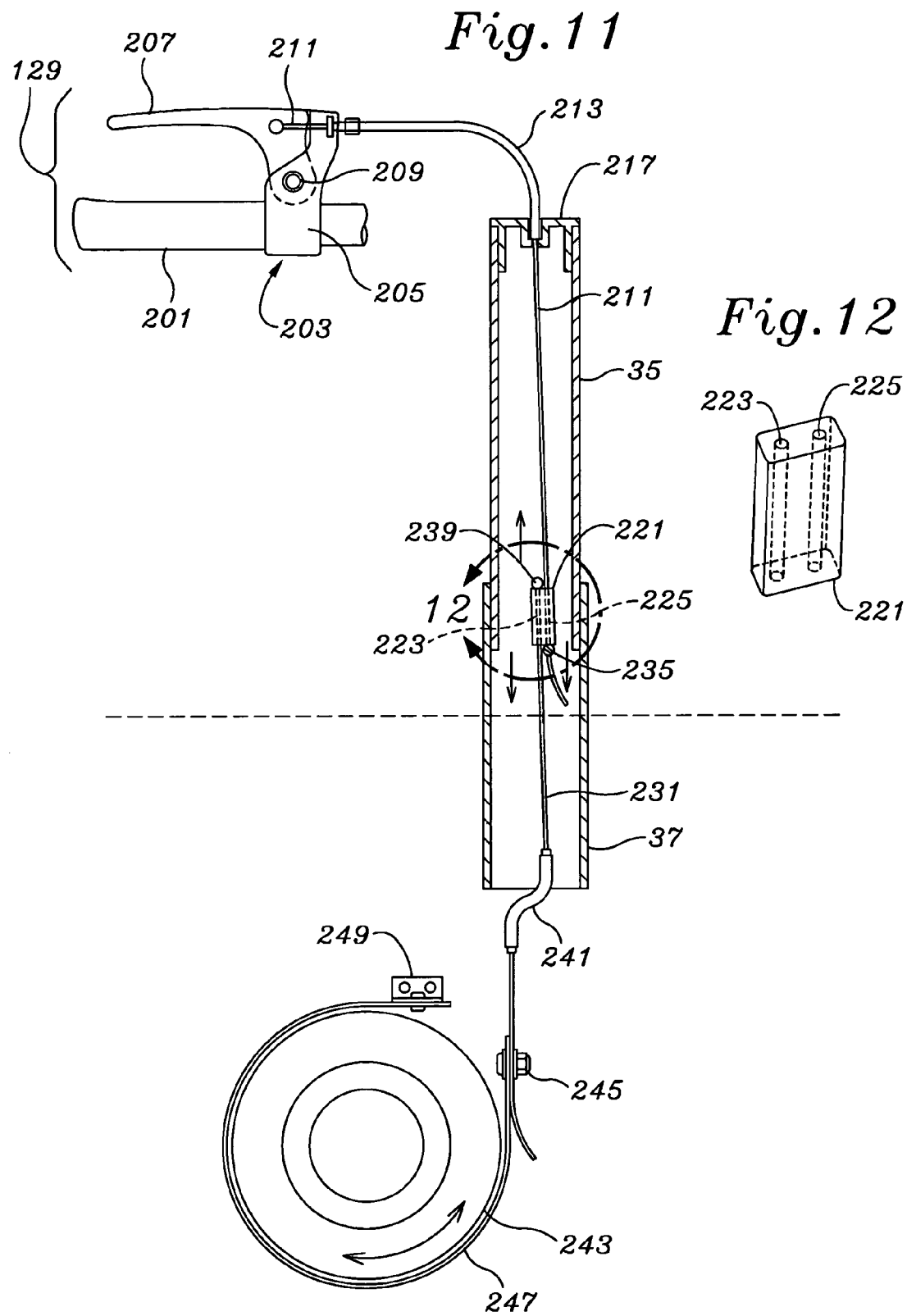

PORTABLE FOLDING BICYCLE

FIELD OF THE INVENTION

The present invention relates to improvements in the technology relating to personal transportation devices, and more particularly to folding bicycles which can fold to a position about the size of a purse or carry bag.

BACKGROUND OF THE INVENTION

Bicycles have been made and sold for over one hundred years. Folding bikes are known and tend to allow a bike to be folded into a smaller yet still bulky or cumbersome size. Furthermore the folding bike can be typically heavier than a non folding similar bike. The provision of a bike that folds into a package small enough to be carried in a general purpose rucksack and light enough to be carried great distances if needs be, has not been available to any practical extent.

In general, bicycles ranging from high performance sports uses to standard personal transportation devices, bicycles have generally had only one limitation -- the space occupied when the bicycle is not in use. Lightweight bicycles are known, but the size has continued to present a problem. One of the main size limitations has been the wheels. Most conventional bicycles have front and rear wheels which range from twenty six to twenty eight inches in diameter. Even ignoring the other structural aspects of the bicycle, the front and rear wheel alone represent the size of two large refuse container lids.

Existing folding bicycle products tend to fold in several actions, often leaving an oiled chain exposed on the outside, and other components of the bike protruding. As a result, conventional folding bicycles can be dirty and dangerous to users and their clothing. Generally the existing bikes tend to remain bulky, even when folded.

One reason that light portable bicycles are especially valuable is the increased need for personal transportation to "fill in" the gaps in the public transportation system. This is especially true for work situations where a commuter may drive to a train station and disembark from a train station which is several miles from work. Even a small portable bicycle would need to be specially stored in the workplace. Carriage of the small bicycle on the train presents an even more severe problem, especially on train lines having a "standing room only" level of crowding. Although some busses have bicycle racks, the racks are too few for the high number of bicycles which should be used.

Another needed "breakthrough" area is that of facilitating bicycle usage by persons with lesser upper body strength. This involves the need for lighter weight and more compact size. The average portable bicycle weighs about twenty-two pounds. Even with a carrying case or backpack, a twenty-two pound weight is a significant weight for a small individual lacking upper body strength. Given that most individuals also have other items to carry, the twenty-two pound average weight is an addition rather than a total carry weight. As such, weight prevents a significant portion of the population from deriving the advantages of portable bicycle use.

In terms of utilization of a bicycle, much of the total picture for increased utilization involves the ability to store the bicycle for occasional uses for times such as when all the busses and trains may not be running. In this case, more continuous workplace storage will need to be facilitated. In large metropolitan areas the office space available to workers continues to shrink. To be available as an "on demand" link, both storage and carriage will need to be facilitated.

SUMMARY OF THE INVENTION

A folding bicycle presents a number of advantages over both conventional and other foldable bicycles. The folded size of 12 ×25×6 inches (305×635×153 millimeters) compares favorably to other folding bicycles, and its 11 lb. (eleven pound, or 5 kilogram mass) weight is significantly superior to even the closest lightweight model at eighteen pounds, and about half of the average portable bike weight of twenty-two pounds. The folded volume of the bike at 1800 square inches is slightly over one cubic foot. The portable bicycle has a folding stowage time of about 10 seconds, and a deployment time of about 6 seconds.

A folding pedal design contributes significantly to a folded lateral profile. Once folding is complete, the package stays automatically locked together. A brake design is very different to a conventional bicycle system and utilizes a banded drum for positive braking and which eliminates the need for periodic adjustment seen in conventional brake system.

The pedal drive uses a power transmission system having a two stage chain drive with a freewheel mechanism located on the crank axle rather than the rear wheel axle. Externally, conventional reflectors are replaced with retro-reflective decals so that the reflectivity will be present and not subject to damage as would a conventional reflector structure.

The folding bicycle herein has pushed the envelope in both size and weight to correspondingly make the advantage of a folding bicycle even more advantageous. With increased usage of the bicycle, the risk of theft can be virtually eliminated, and it can readily be taken away on holidays or occasional excursions with a reduced consciousness of being specially taken along. Users will tend to make the folding bicycle a normally carried item in backpacks, automobiles, office filing cabinets, brief cases, boats, apartments, car boots, cupboards, and more.

The folding bicycle herein has only four parts which are un-clamped and folded, (1) the main frame, (2) the handle-bar, (3) the saddle, and (4) the pedals. The folding bicycle herein includes a design which provide the user with a reasonably compact product that can be used in different environments. Furthermore, the folding bicycle herein has its internal mechanisms concealed to eliminate protruding elements which could injure the user or causing damage to the user's clothing or storage structures. The compact, self-contained streamlined folding bicycle allows the user to handle and the product without affecting the user's daily routines. The quick folding and unfolding procedure enables the user to avoid using any significant time in the folding/unfolding process.

In addition, the increased use of a folding bicycle would reduce security to a minimal level as the user could take the bike with them as apposed to leaving it outside, therefore reducing the possibility of theft or vandalism. The size would also allow the bike to be taken onto public transport without it intruding into other people's space and would be manageable to the user.

The resulting folded bicycle has no projections or loose parts, and the folded package is easy to handle. The saddle forms a natural handle for the folded stowed structure. The drive mechanism is completely enclosed, meaning that carpets and upholstery are not marked. No vulnerable parts are exposed to damage and, most importantly, the cable runs are fully protected.

BRIEF DESCRIPTION OF THE DRAWINGS

The invention, its configuration, construction, and operation will be best further described in the following detailed description, taken in conjunction with the accompanying drawings in which:

FIG. 4 is a view in accord with the view of FIG. 3 and shown in a partially lowered position with respect to the upper components and with the seat tube brought to a horizontal position;

FIG. 5 is a view in accord with the view of FIG. 4 and shown with the seat brought slightly downward and with the front and rear telescoping tubes brought to a fully stowed position;

FIG. 6 is a view in accord with the view of FIG. 5 and shown with the seat brought to a vertical, fully stowed position, and with the handle bar connection member turned rearwardly 180°;

FIG. 11 is a schematic view of the brake system of the front telescoping tube and front wheel; and FIG. 12 is a perspective view of a double channel slide block used with the front telescoping tube and front wheel brake system.

DETAILED DESCRIPTION OF THE PREFERRED EMBODIMENT

Figure 1:
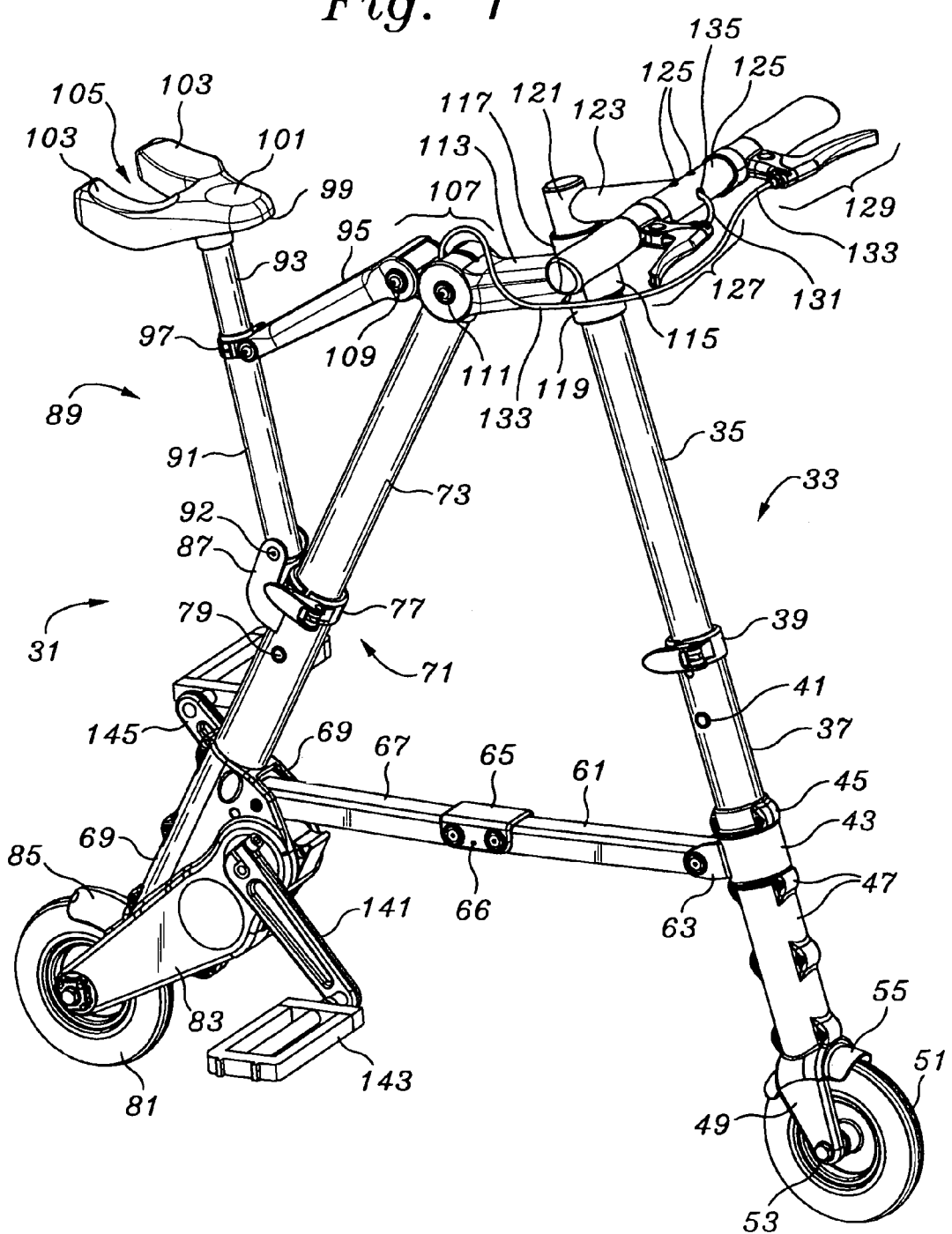
FIG. 1 is a perspective view of the folding bicycle in a deployed position.

The description and operation of the invention will be best initiated with reference to FIG. 1 which illustrates a side view of a folding bicycle 31 shown in its fully deployed position. Structures seen include a major triangular assemblage of structures including a collapsible triangular frame formed from a collapsible front steering tube assembly 33 that includes a telescopic inner tube 35 which telescopes with respect to a telescoping outer tube 37 and is secured by a quick release clamp 39, and a locking button 41 seen through its aperture. The front steering tube assembly 33 is rotatable within a front steering joint 43. Front steering joint 43 is flanked on its upper and lower sides by an upper fitting 45 and an expanded length lower fitting 47. Below the lower fitting 47 is a fork 49 which engages a front wheel 51 and its axle bolt 53. An abbreviated length fender 55 is seen. The lower fitting 47 is seen to have six reinforced areas which join two halves of the lower fitting 47 by bolting or riveting.

Pivotally attached to the front steering joint 43 is a forward pivoting strut 61 which is attached to the front steering joint 43 by a pair of opposing ear lugs, only one ear lug 63 is seen in FIG. 1. The other end of forward pivoting strut is connected to a center joint 65.

Center joint 65 is in the form of a "U" shaped length of tubing with the side walls forming pivot ear lugs at points near one end where forward pivoting strut 61 pivotally connects to it. Center joint 65 will preferably have a locking button 66, or an internal bolt latch to insure that it positively engages forward and rearward pivoting struts 61 and 67 to keep them in alignment while the bicycle 31 is deployed. The locking button may have an internal block which is urged against the flat ends of the forward and rearward pivoting struts 61 and 67 when they are in co-axial position.

Pivotally attached to the other end of the center joint 65 front steering joint 43 is a rearward pivoting strut 67 which is attached to the center joint 65 at its rear with the opposing side walls forming pivot ear lugs at points near the end opposite the connection to the forward pivoting strut 61. The orientation of the center joint 65 is that it enables the forward and rearward struts 61 and 67 to open and lie in a collinear relationship in linear alignment with the center joint 65 during its deployed orientation. In folding, as will be seen, center joint 65 is attached to enable it to rise as the forward and rearward struts 61 and 67 pivot angularly down with respect to the center joint 65.

The rearward most end of rearward strut 67 is attached into the upper portion of the crankcase housing 69 in an orientation that will enable rearward strut 67 to be angularly displaced upwardly with respect to the crankcase housing 69 on stowage. The crankcase housing 69 is attached to or around a collapsible rear tube assembly 71 which includes a rear telescopic inner tube 73 which telescopes with respect to a telescoping outer tube 75 and is secured by a quick release clamp 77, and a locking button 79 seen through its aperture.

The crankcase housing 69 forms a fork-like attachment to a rear wheel 81, along with a driven connection to be shown. On the right side of the crankcase housing 69 seen in FIG. 1, a flat removable housing cover 83 accommodates the internal driven connection. A rear fender 85 can also be seen.

Rearwardly adjacent the quick release clamp 77, is a seat tube fitting 87 having ear lugs which pivotally engage a seat tube assembly 89 at the lower end of a telescopic outer tube 91, about a pivot axis 92. An inner tube 93 fits within the outer tube 91. At the top of the outer tube 91, a stay 95 is pivotally connected to a fitting 97 at the top end of the outer tube 91. The fitting 97 does not slide, but is mounted to an exacting level on the outer tube 91. The fitting 97 includes a release (on the side opposite that shown in FIG. 1) to fix the upward and downward position of the inner tube 93 with regard to the outer tube 91 in order to set the height of a seat or saddle 99. Saddle 99 has a forward central portion 101 and a pari of rearwardly extending ischial supports 103 which define an accommodation slot 105 therebetween. The ischial supports 103 support the rider and the area which would otherwise be occupied by the accommodation slot 105 is typically not utilized during seated riding. The accommodation slot 105 enables the saddle 99 to extend partially around the rear of the crankcase housing 69 during stowage in order to take up slightly less space.

The other end of the stay 95, the stay 95 is pivotally connected to a double fitting 107 which defines a pair of pivot axes. A first pivot axis 109 exists between the double fitting 107 and the end of the stay 95. A second pivot axis 111 exists between the double fitting 107 and the upper end of the rear telescopic inner tube 73. As will be seen, this double fitting 107 provides an offset which will allow a parallel relationship of the outer tube 91 with respect to the telescoping outer tube 75. The stay 95 has a general inverted "U" cross sectional shape both for increased strength, and to allow it to accommodate the telescopic outer tube 91 more closely adjacent the telescoping outer tube 75 in the folded stowage position.

The double fitting 107 is also mechanically connected to an upper steering joint member 113 having its other end connected to a steering pivot 115. The double pivot enables the upper steering joint member 113 to pivot with respect to the rear telescopic inner tube 73. The steering pivot 115 also includes an upper spacer 117 and lower spacer 119 which helps to define and offset the other relationships. Lower spacer 119 limited the extent to which the telescoping inner tube 35 can fit inside the telescoping outer tube 37.

Atop the steering pivot 115 is a boss 121 in the shape of a cylinder and from which a handlebar connection member 123 extends and attaches to a main handle bar support 125 having a pair of oppositely oriented handlebar locking buttons 126 which, as will be shown, are used to enable elements of the handle bar structures to be folded. At each end of the main handle bar support 125 is a right handle and brake assembly 127 and a left handle and brake assembly 129.

A control cable 131 from right handle and brake assembly 127 enters an aperture 135 in the main handle bar support 125. A control cable 133 from left handle and brake assembly 129 simply leads back to the front part of the double fitting 107, where cable 133 enters the rear telescopic inner tube 73. As will be seen, the right handle and brake assembly 127 and left handle and brake assembly 129 are axially displaceable from the main handle bar support to a position where they may be folded to a horizontal position.

Also seen in FIG. 1 is a right pedal crank 141 and right pedal 143, as well as a left pedal crank 145 and left pedal 147. The pedals 143 and 147 are shown in their unfolded, deployed position. Folding cab involve movement of the pedals 143 and 147 typically toward their respective pedal cranks 141 and 145, to a position where they may be pivoted or folded in a position roughly parallel to the crank. Other mechanisms can be used to achieve folding pedals, including buttons, latches, and the like. The pedals 143 and 147 will have the stability not to unfold while the bicycle 31 is deployed and in use.

Figure 2:
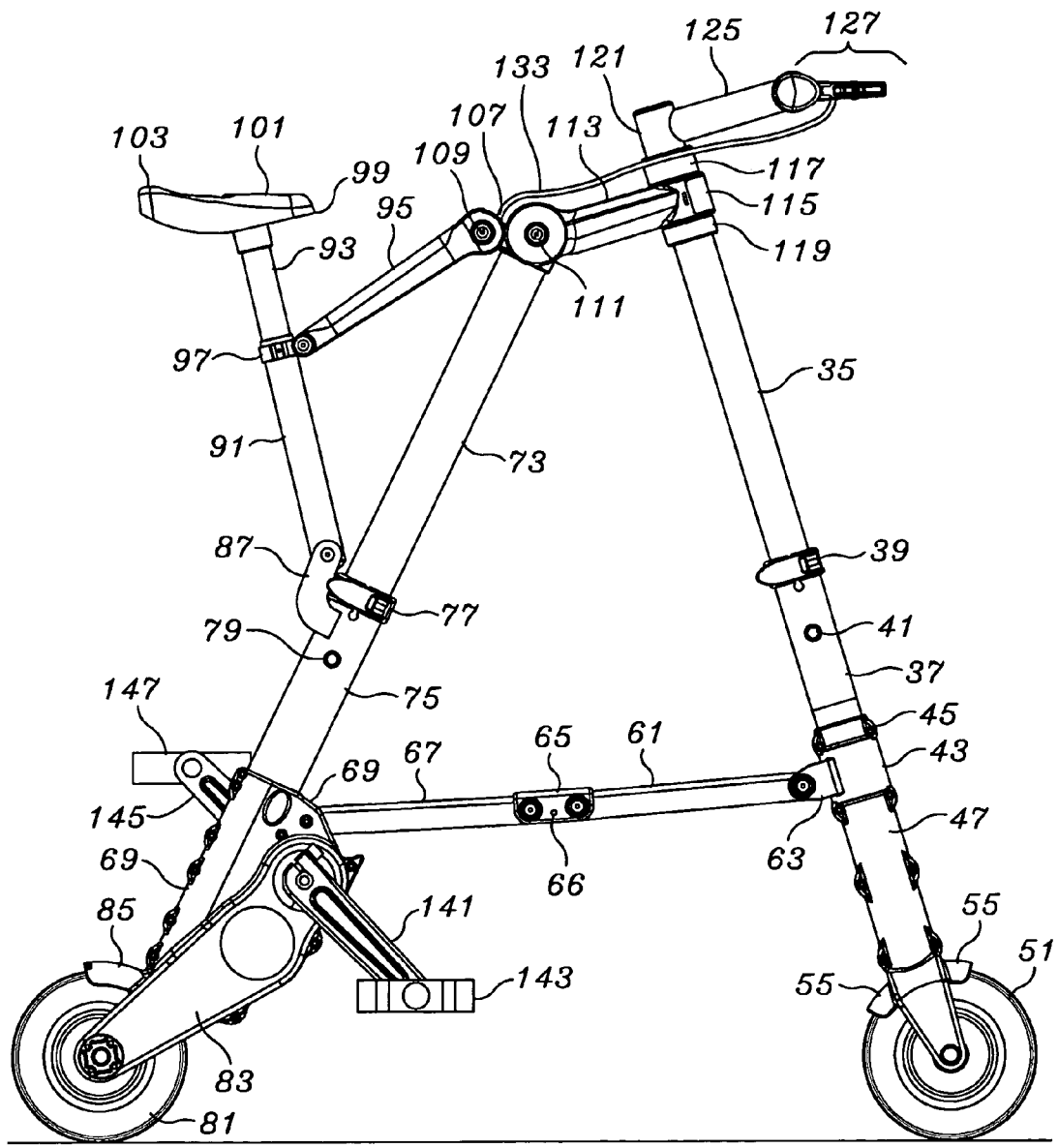
FIG. 2 is a side view of the folding bicycle in FIG. 1 and illustrating further details of construction.

Referring to FIG. 2, the elements identified in FIG. 1 can be more clearly seen. The shape of seat 99 and the spacing relationship of the first and second pivot axes 109 and 111 are seen. Both the spacing relationship of first and second pivot axes 109 and 111 and the size and shape of the stay 95 and tube 91 will permit a close parallel stowed relationship.

Figure 3:
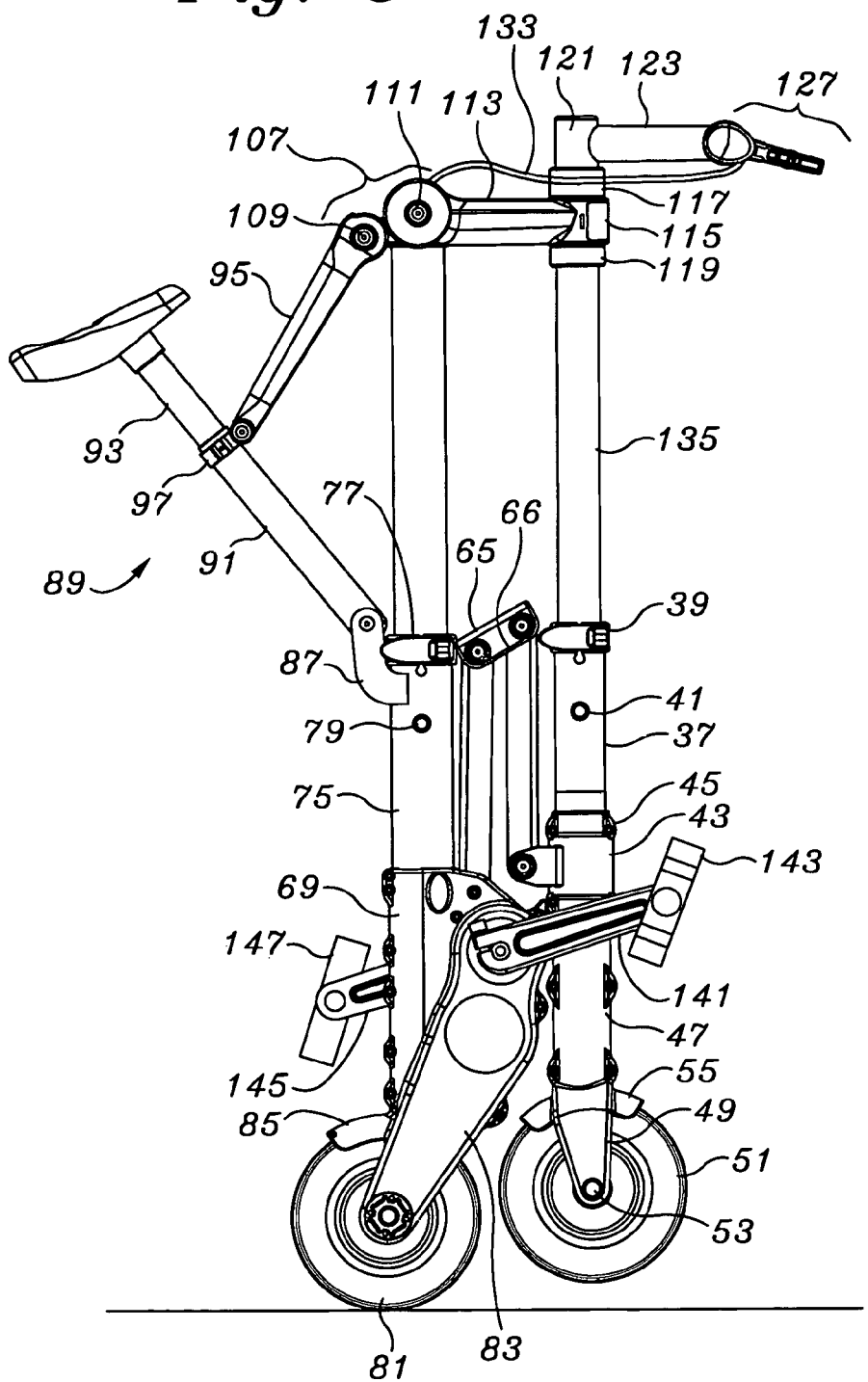
FIG. 3 is a side view in accord with the view of FIG. 2 and shown in a folded position at normal height.

Referring to FIG. 3, the bicycle 31 is shown in a position where the steps necessary to fold it have been accomplished. The steps necessary to achieve the configuration shown in FIG. 3 includes merely the actuation of the locking button 66 and the raising of the center joint 65 upwardly to cause the forward and rearward pivoting struts 61 and 67 to begin to angularly pivot toward a more parallel relationship with respect to their adjacent telescoping front outer tube 37 and rear outer tube 75. It should be noted that while a user is riding the bicycle 31 that the resultant forces on the wheels 51 and 81 will act to keep the forward and rearward pivoting struts 61 and 67 in alignment, as well as the mechanism of the locking button 66.

Note that the front quick release clamp 39 is slightly above the rear quick release clamp 77 and that the front wheel 51 is slightly above the rear wheel 81. This configuration occurs when the "A" frame is folded in and before the height of the bicycle 31 is reduced. This illustrates that the center joint's double pivoting connection enables some upward and downward relative movement of the front telescoping outer tube 37 with respect to the rear telescoping outer tube 75.

Referring to FIG. 4, it can be seen that the front quick release clamp 39 is now slightly below the rear quick release clamp 77 and that the front wheel 51 is level with the rear wheel 81, and that the center joint 65 is also generally level wit the ground. FIG. 4 especially illustrates that the locking buttons 41 and 79 have been pressed in to unlock the front telescoping inner tube 35 and rear telescoping inner tube 73 such that only their apertures can be seen, and that the quick release clamps 39 and 77 have been unlocked to allow the unlock the front telescoping inner tube 35 and rear telescoping inner tube 73 to telescopingly collapse into their respective front outer tube 37 and rear outer tube 75. Note that as the rear telescopic inner tube 73 collapses with respect to the collapsible rear tube assembly 71 that more of the control cable 133 from left handle and brake assembly 129 will loop upwardly with respect to the top of the bicycle 31.

The telescoping inner tubes 35 and 74 are shown only partially collapsed to emphasize the transition position of the telescoping outer seat tube 91. At this middle position, note that the double fitting 107 has enabled pivot axis 109 to not only be rearwardly displaced with respect to pivot axis 111, but that during the downward travel of the telescoping inner tubes 35 and 74 seen in FIGS. 3 and 4, that pivot axis 109 lies directly over and travels straight toward pivot axis 92.

The seat telescoping outer tube 91 has reached a horizontal position and it may be that seat telescoping inner tube 93 may need to be slightly brought more telescopingly within seat telescoping outer tube 91 in cases where it is extended for taller riders, especially where the length of the outer tube 91 can accommodate a much longer extension of the inner tube 93 than is seen in FIG. 4. Note also that the fitting 97 does not move with respect to the outer tube 91 upon folded stowage.

Referring to FIG. 5, as has been mentioned, the stay 95 has an inverted "U" shape which is sufficient to partially cup or surround the seat outer tube 91. Further, note that the pivot axis 109 of the double fitting 107 has covered over and is collinear with the pivot axis 92 of the seat tube fitting 87 (covered and by the pivot axis 109 and thus not seen). This enables both the stay 95 and the seat outer tube 91 to continue to pivot downwardly about a common pivot axis. This common pivot axis movement serves to further lock the telescoping inner tubes 35 and 74 in the stowed position with respect to the telescoping inner tubes 35 and 74.

Quick release clamp 39 is shown in the open position and quick release clamp 77 is shown in the closed position. Locking the clamps 39 and 77 will further prevent any unintended deployment once the bicycle 31 is in the stowed position. Note the lower spacer 119 position with respect to the clamp 39. The stabilized stowed position is achieved with wheels 51 and 81 level.

Referring to FIG. 6, the seat outer tube 91 is shown in a position of continued movement about the pivot axis 109 where the seat outer tube 91 is parallel to both the rear telescoping outer tube 75 and stay 95. Note that the ischial supports 103 of the seat 99 are forward of the rearward most extent of the crankcase housing 69 due to the accommodation slot 105. Again, the stay 95 is seen continuing to partially cup or surround the seat outer tube 91.

Having achieved the position shown in FIG. 6, the next step in folding to stowage position is the turning of the main handle bar support 125 to a position 180° from that shown in FIGS. 1–5, so that the handle bar connection member 123 will lie rearwardly and over and generally parallel to the upper steering joint member 113. Note that the extra length of the control cable 133 from left handle and brake assembly 129 will actually facilitate the turning of the main handle bar support 125 by providing enough of a length to gently loop.

In the deployed position, the front telescopic inner tube 35 is fixed with respect to the telescoping outer tube 37 both by engagement of the quick release clamp 39 and the interlocking of the locking button 41. Both of these structures are engaged when the bicycle 31 is in the deployed position. Once the bicycle 31 is begun to be folded, the locking button 41 and the release clamp 39 are disengaged. This leaves relative rotational displacement possible between the front telescopic inner tube 35 and the main handle bar support 125 affixed to it, with respect to the telescoping outer tube 37.

Thus the user simply rotates the main handle bar support 125 by 180° to place the main handle bar support 125 directly over the upper steering joint member 113. Once the main handle bar support 125 directly over the upper steering joint member 113, the quick release clamp can be re-engaged to fix the position of the main handle bar support 125. However, the folding down of the saddle 99 and the locking into place of the quick release clamp 77 would be sufficient to maintain folded stability. Only the locking button 41 aperture is seen as the locking button is depressed, within the annular space between the forward telescopic inner tube 35 and telescoping outer tube 37, and on the side opposite the aperture through which it locks.

Once the main handle bar support 125 and handlebar connection member 123 are directly over the upper steering joint member 113, the handlebar structures are in a position to be further compactly folded. In FIG. 1, a pair of pair of oppositely oriented handlebar locking buttons 126 were seen on the main handle bar support 125. Each one of the pair of oppositely oriented handlebar locking buttons 126 is associated with the right handle and brake assembly 127 and left handle and brake assembly 129 located underneath it.

Figure 7:
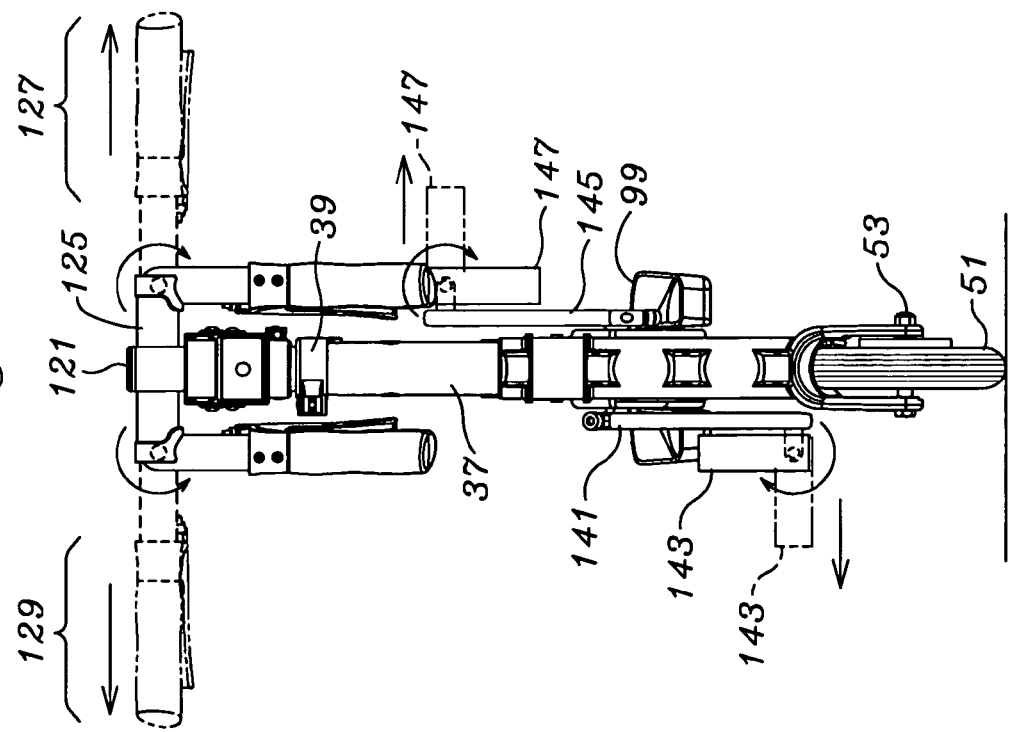
FIG. 7 is a front view of the bicycle in accord with FIG. 6 and illustrating the folding of handle and brake assemblies and pedals.

Referring to FIG. 7, a front view of the bicycle 31 seen in the position shown in FIG. 6 with the handlebar connection member 123 rotated rearward, is shown. The boss 121 is seen prominently, and the brake handles of the right handle and brake assembly 127 and left handle and brake assembly 129 (shown in dashed line format collinearly with the main handle bar support 125, are seen to be pointed rearwardly. The arrows indicate that, after depression of the pair of oppositely oriented handlebar locking buttons 126, the right and left handle and brake assemblies 127 and 129 are pulled axially outwardly until the fullest outward extent of movement is possible.

Each of the right and left handle and brake assemblies 127 and 129 are mounted within the main handle bar support 125 on a guide pins (not shown) so that they may be axially moved out of their respective end of the main handle bar support enough that only the pivoting action of the guide pins (not shown) hold them with respect to the main handle bar support 125. The bottom portions of the ends of the main handle bar are removed to enable the right and left handle and brake assemblies 127 and 129 to fold down once they have moved to their outermost extent.

The solid line rendering of the right and left handle and brake assemblies 127 and 129 illustrate their having been pivoted downwardly to a position parallel with the front telescoping outer tube 37. At the ends of the right and left handle and brake assemblies 127 and 129 closest to connection with the main handle bar support 125, the freed, oppositely oriented handlebar locking buttons 126 can be seen. Upward rotation of the right and left handle and brake assemblies 127 and 129 will place oppositely oriented handlebar locking buttons 126 into a depressed position automatically as they are raised and they will not need to be depressed in order to re-enter the main handle bar support 125. The re-engagement of the clamp 39 is suggested, but it can be seen that the vertically downward position of the right and left handle and brake assemblies 127 and 129 lend additional stability to prevent unintended rotation of the handlebar connection member 123 and main handle bar support 125.

Also seen in FIG. 7 are the folding of the right and left pedals 143 and 147. Typically the unfolding may accomplished by a latch or by movement of the pedals slightly outwardly to an un-locked position and then folding toward the associated cranks 141 and 145. Further, if a mechanism is utilized which will permit folding the pedals 143 and 147 only toward their respective cranks 141 and 145 and not away from them, a greater degree of stability during riding can be achieved. Folding the pedals 143 and 147 toward their respective cranks 141 and 145 creates roughly the same degree of horizontal compactness as the outermost extent of the upper vertically hanging right and left handle and brake assemblies 127 and 129.

Figure 8:
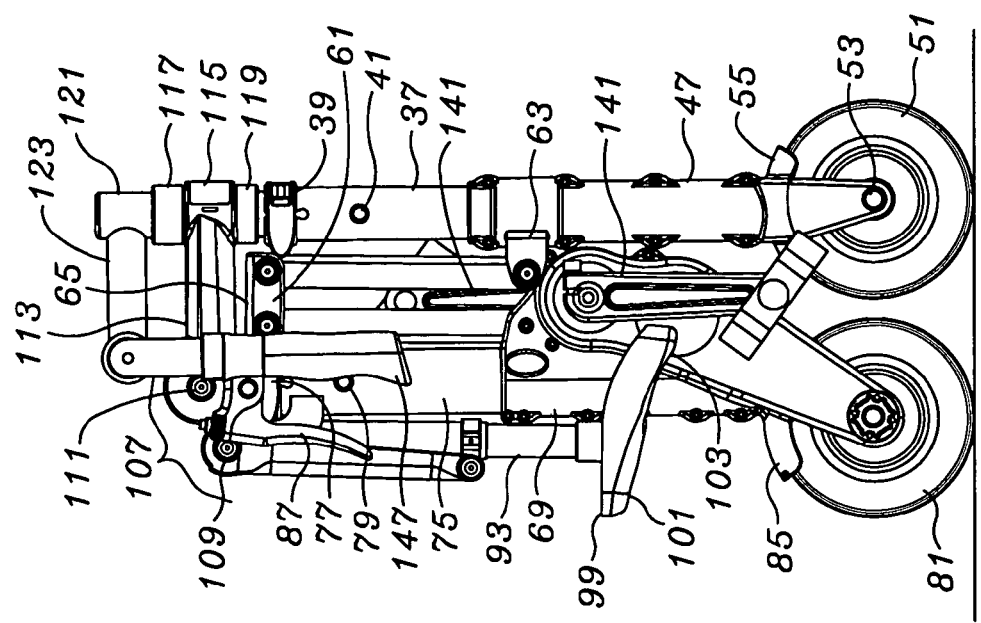
FIG. 8 is a side view of the fully folded bicycle shown in FIG. 7.

FIG. 7 and its solid line structures represents the full extent of folding of the bicycle 31, and illustrates the lateral compactness achieved in the present inventive design. Referring to FIG. 8, a right side view similar to that seen in FIGS. 4–6 gives a visual impression of the forward to rear compactness and height compactness of the bicycle 31. As before, the bicycle 31, in the states shown in FIG. 8 has an overall dimension of 12×25×6 inches (305×635×153 millimeters).

Figure 9:
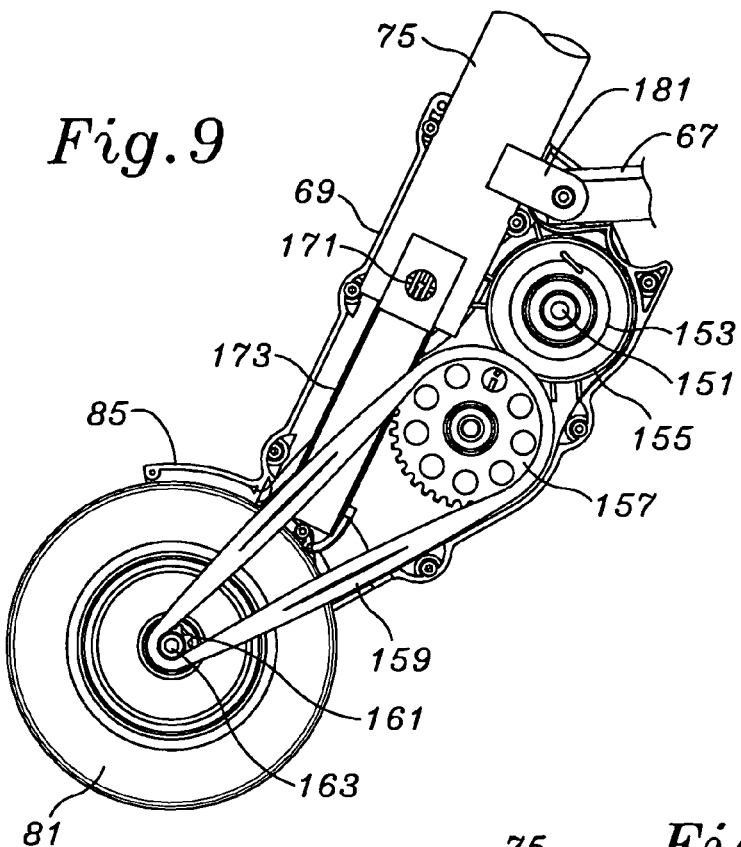
FIG. 9 is an expanded view of the drive mechanism with the right side of the crankcase housing removed.

Referring to FIG. 9, a closeup of the back half of the crankcase housing 69 taken from the perspective of the right side of the bicycle illustrates the mechanical internals of the crankcase. A crank axle 151 has a free wheeling clutch, including an inner clutch drive 153 immediately surrounding it. Inner clutch drive 153 is mechanically connected to an outer clutch drive 155 for rotation of the inner clutch drive 153 in one direction only.

Most typical bicycles locate the free wheeling clutch on the wheel axle. The free wheeling clutch is a disengagement between the crank axle 151 (and the cranks 141 and 145) for times when the driven wheel 81 is spinning faster than the crank axle 151. This enables the bicycle 31 to coast down hill without corresponding forward mechanical movement of the crank axle 151, and cranks 141 and 145.

Outer clutch drive 155 is mechanically connected to a main sprocket 157. Main sprocket 157 has a chain 159 (shown schematically) connected to an axle sprocket 161 attached to an axle 163. As can be seen by comparing FIG. 9 to FIGS. 4 and 5, the flat removable housing cover 83 (in addition to the right side half of the crankcase housing 69 upon which crankcase housing 69 fits) completely isolates the chain 159 from any possible contact with the user. Chain contact is a major source of soiled and destroyed clothing, and can cause accidents. Both the wheels 51 and 81 are preferably made of a solid polymeric material and thus the need for servicing or any reason to open the crankcase housing 69 should be largely eliminated.

Details of engagement of the lower end of the rear telescoping outer tube 75 are seen. An engagement structure 171 contacts and bears against the rear telescoping outer tube 75 and has a lower member 173 to engage structures in the left half of the crankcase housing 69 shown. Also exposed is an ear lug 181 which lies just inside an opening the crankcase housing 69 seen in FIG. 1. Ear lug 181 enables the rearward pivoting strut 67 to move angularly from the deployed position seen in FIG. 1 to the foldably stowed position seen in FIG. 8.

Figure 10:
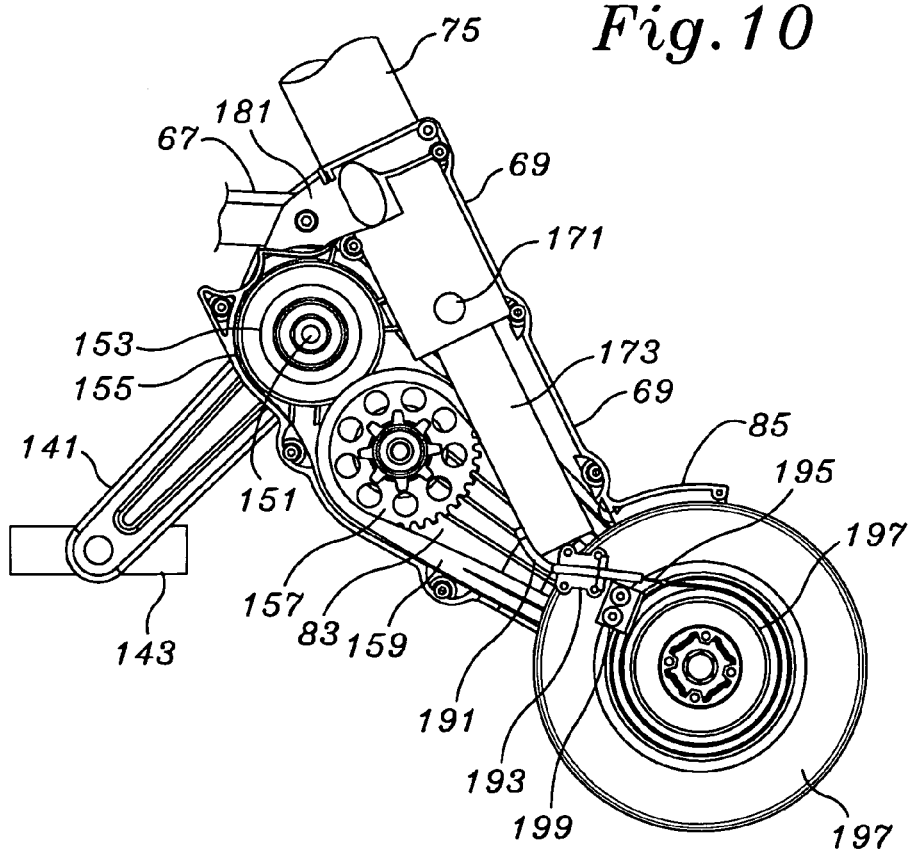
FIG. 10 is an expanded view of the braking and drive mechanism with the left side of the crankcase housing removed.

Referring to FIG. 10 a view oppositely oriented with respect to FIG. 9 is taken against the right half of the crankcase housing 69 and its attached flat removable housing cover 83. This view illustrates the terminal portions of a braking system. A shielded cable 191 emanates from an aperture or slot in the lower member 173. The cable may include a bracket 193 which is preferably attaches the outer shielding of the shielded cable 191 to the removed left half of the crankcase housing 69 in order to stabilize and control the end of the shielded cable 191.

The shielded portion of the shielded cable 191 is seen to extend slightly beyond the bracket 193, and then terminate. At the termination, an inner wire core 195 extends from the end of the shielding in a direction tangential to a brake drum 197, then surrounding the brake drum 197, and terminating at a bracket 199.

Like bracket 193, the bracket 199 appears to float, but is in fact attached to the left half of the crankcase housing 69 which has been removed to reveal the components of the brake system. Both the brackets 193 and 199 are used to control the angle and resting position of the inner wire core 195 as it surrounds the brake drum 197. It is important that during non-brake operation of the bicycle 31 that the inner wire core 195 enable friction free movement of the brake drum 197. The brackets 193 and 199 control of the angle of approach around both sides of the brake drum 197 achieve this.

Note that with regard to FIG. 10, the normal forward motion of the bicycle 31 occurs from right to left and that the wheel 81 turns counterclockwise. Tightening of the inner wire core 195 by withdrawing it into the shielded portion of the shielded cable 191 will produce a pulling of the inner wire core 195 against the bracket 199. The brake drum 197 then somewhat frictionally moves against the inner wire core 195 in a way to very slightly tighten it further against the bracket 199.

If the direction of movement were reversed, the friction of the brake drum 197 would tend to pull the inner wire core 195 away from the termination of the shielding of the shielded cable 191 can tend to counteract the force used to withdraw the inner wire core 195 and weaken the braking from the standpoint of the user. Thus, the configuration shown enhances the manual pressure used to affect braking while using brackets to control the angularity and degree of approach of the inner wire core 195 with respect to the brake drum 197. So long as the inner wire core 195 is effectively spring loaded to return to a rest position with sufficient slack, the non-brake operation should be effectively friction-free.

Referring to FIG. 11, a schematic drawing of one possible realization for the braking system for the front wheel 51 is shown. Whereas the rear wheel 81 included a shielded cable which increasingly protrudes from the double fitting 107, the braking system for the front wheel 51 doesn't have the protrusion action but rather includes a different method to achieve collapsibility. Typically, the left handle and brake assembly 129 is used to brake the front tire 51.

As can be seen with the larger detail, the left handle and brake assembly 129 includes a handle 201 and a brake assembly 203 mounted thereon. Brake assembly 203 includes an attachment fitting 205 and a lever 207 which is set to pivot with respect to the attachment fitting 205. Typically the lever 207 will include a spring (not shown) which will urge the lever 207 away from the handle 201 and into a position in which it is shown unless a user manually actuates it. The springs typically used are coil springs surrounding a pivot point 209 between the lever 207 and brake assembly 203.

A first length of raw cable 211 is positioned with respect to a shielded cable 213 so that movement of the lever 207 will pull the first length of raw cable 211 through the shielded portion. The short length of shielded cable 213 terminates at a plate 217 so that movement of the first length of raw cable 211 beyond the extent of the plate 217 will pull the raw cable 211 toward the plate 217.

Plate 17 or its equivalent can be introduced anywhere above the lower spacer 119 and such that any movement of the telescopic inner tube 35 with respect to the telescoping outer tube 37 will not interfere with the first length of raw cable 211. In the example of the inventive bicycle 31, the plate 217 or similar structure can be placed at the handlebar connection member 123, boss 121 or main handle bar support 125, or even within the telescopic inner tube 35.

Telescopic inner tube 35 is shown schematically with respect to the telescoping outer tube 37. The other surrounding structures are simply not shown so that the clarity of action can be emphasized. The first length of raw cable 211 extends through a double channel slide block 221. Referring to FIG. 12, the double channel slide block 221 is a small unitary volume of material having a pair of bores, including first bore 223 and second bore 225. The first and second bores should be made of sufficient diameter that both the first length of raw cable 211 and a second length of raw cable 231 can slide through easily, but not so large that termination beads can enter, jam or pass through.

The main idea for double channel slide block 221 is that any slack in the first or second lengths of raw cable 211 or 231 will result in at least one of them sliding through the double channel slide block 221 to relieve bunching. Without the double channel slide block 221, a single length of raw cable would at best be forced to spiral about the inside of the telescopic inner tube 35 or the telescoping outer tube 37, or pinched at their junction.

The first length of raw cable 211 is shown extending through bore 225 of the double channel slide block 221 and terminates at a termination bead 235 at the outside of the other end of the through bore 225. Second length of raw cable 231 is shown extending through bore 223 of the double channel slide block 221 in the other direction and terminates at a termination bead 239 at the outside of the other end of the through bore 223.

Beyond the double channel slide block 221, the second length of raw cable 231 is shown extending through bore 223 of the double channel slide block 221 and through the bottom of the front telescoping outer tube 37. An optional fixed length of raw cable channel 241 or some other physical path directing device can be used to position the remaining structures with respect to a brake drum 243.

The other structures may include the continuation of the raw cable about the brake drum 243, or a fitting 245 may be provided to make length adjustments with respect to a specialized band 247. The band 247 (or cable) may be fixed with respect to a bracket 249. The direction of normal forward motion of the brake drum 243 is shown in either direction to emphasize that the front wheel may be made to turn in a direction which might mitigate the force applied by the lever 207. This may depend upon the other mechanics employed in the front brake system.

The operation of the schematic of FIG. 11 is as follows. Once folding of the bicycle 31 begins, the telescopic inner tube 35 will begin to move downward with respect to the telescoping outer tube 37. The first length of raw cable 211 will move toward the second length of raw cable 231. Because the termination beads 235 and 239 move away from the double channel slide block 221, both the first and second lengths of raw cable 211 and 231 can slide past each other within the double channel slide block 221.

If the double channel slide block 221 is made of metal, and if the bicycle 31 is foldably stowed in a position where the telescopic inner tube 35 and telescoping outer tube 37 are vertical, it is likely that the double channel slide block 221 will move downward with the raw cable 211 as the second length of raw cable 231 will move through the bore 223 and upward toward the plate 217. Thus, even where one cable predominantly moves through the double channel slide block 221 while the other may remain fixed through gravity or the like, the double channel slide block 221 will act as a guide for the other cable. In any event, the double channel slide block 221 helps to organize and direct the first and second raw cables 211 and 231 with respect to each other.

Upon re-deployment and unfolding of the bicycle 31, the tensile force link between the first and second raw cables 211 and 231 will automatically be re-established. It should be noted that upon deployment, the locking button 41 will re-engage only upon a full extension of the telescopic inner tube 35 with respect to the telescoping outer tube 37, and therefore the relative lengths of the tubes 35 and 37 will be the same each time the bicycle 31 is deployed. As such, multiple deployments and foldable stowage operations will not upset the exactitude of the connection between the first and second lengths of raw cable 211 and 231.

While the present invention has been described in terms of a portable folding bicycle, & more particularly to a particular set of mechanical structures which exhibit maximum compactness, ease of deployability and stowage and light weight, the mechanisms disclosed can be applied to other devices.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A portable folding bicycle comprising:
   a collapsible front tube assembly having a first end and a second end supporting a front wheel;
   a collapsible rear tube assembly having a first end pivotally linked to said first end of said collapsible front tube assembly and a second end supporting a rear wheel;
   a crankcase housing supported by said rear tube and drivably connected to said rear wheel; and
   a foldable link connected between said front tube assembly and said rear tube assembly at locations closer to said second ends of said front and rear tube assemblies than said first ends of said front and rear tube assemblies.

2. The folding bicycle as recited in claim 1 wherein said foldable link further comprises:
   a forward pivoting strut having a first end pivotally attached to said collapsible front tube assembly, and a second end;
   a rearward pivoting strut having a first end pivotally attached to said collapsible rear tube assembly, and a second end pivotably linked to said second end of said forward pivoting strut.

3. The folding bicycle as recited in claim 1 and further comprising:
   a collapsible seat tube having a first end pivotally connected to said collapsible rear tube assembly and a second end;
   a seat supported by said second end of said collapsible seat tube; and
   a rear tube link having a first end connected to and displaced from said first end of said collapsible seat tube, and a second end attached adjacent said first end of said collapsible rear tube assembly.

4. The folding bicycle as recited in claim 3 wherein said seat includes a rearward accommodation slot to facilitate fitting around said collapsible rear tube assembly in a folded position.

5. The folding bicycle as recited in claim 3 wherein said rear tube link second end pivots about a first pivot axis laterally displaced from said collapsible rear tube assembly.

6. The folding bicycle as recited in claim 5 wherein said collapsible seat tube first end pivots about a second pivot axis laterally displaced from said collapsible rear tube assembly and wherein said first pivot axis and said second pivot axis are displaceable toward each other to a collinear relationship.

7. The folding bicycle as recited in claim 1 wherein said collapsible front tube assembly further comprises an upper telescopic inner tube having a first end and a second end and carried within a lower telescoping outer tube having a first end and a second end, and further comprising a locking structure for selectably fixing an axial displacement of said upper telescopic inner tube with respect to said lower telescoping outer tube and for fixing relative rotation of said upper telescopic inner tube with respect to said lower telescoping outer tube, and wherein said front wheel is supported adjacent said second end of said lower telescoping outer tube.

8. The folding bicycle as recited in claim 1 wherein said collapsible rear tube assembly further comprises an upper telescopic inner tube having a first and a second end and carried within a lower telescoping outer tube having a first end and a second end, and further comprising a locking structure for selectably fixing an axial displacement of said upper telescopic inner tube with respect to said lower telescoping outer tube and wherein said rear wheel is supported adjacent said second end of said lower telescoping outer tube.

9. The folding bicycle as recited in claim 8 and further comprising a collapsible seat tube having a first end pivotally connected to said collapsible rear tube assembly adjacent an upper end of said lower telescoping outer tube, and a second end;
   a seat supported by said second end of said collapsible seat tube; and
   a rear tube link having a first end connected to and displaced from said first end of said collapsible seat tube, and a second end attached adjacent an upper extent of said upper telescopic inner tube of said collapsible rear tube assembly.

10. The folding bicycle as recited in claim 1 wherein at least one of said front and rear wheels includes a brake drum and further comprising a cable at least partially encircling said brake drum and enabled to tighten around said brake drum to brake said rear wheel.

* * * * *